United States Patent [19]

Lind et al.

[11] Patent Number: 5,047,441

[45] Date of Patent: Sep. 10, 1991

[54] RIGID POLYURETHANE FOAMS PREPARED FROM POLYVINYL ACETATE/ALLYL ALCOHOL POLYOLS, AND PROCESS FOR MAKING SAME

[75] Inventors: Eric J. Lind, Schaumburg, Il.; Manfred L. Genz, Dearborn; Michele L. Lee, River Rouge; Thomas B. Lee, Southgate, all of Mich.

[73] Assignee: BASF Corporation, Wyandotte, Mich.

[21] Appl. No.: 392,257

[22] Filed: Aug. 10, 1989

[51] Int. Cl.$^5$ .............................. C08G 18/14
[52] U.S. Cl. ............................ 521/137; 521/914; 521/174; 528/75; 528/103
[58] Field of Search ............... 521/137, 157, 94, 174; 528/75, 103

[56] References Cited

U.S. PATENT DOCUMENTS

| | | | |
|---|---|---|---|
| 3,673,168 | 6/1972 | Burke, Jr. et al. | 526/212 |
| 3,850,861 | 11/1974 | Fabris et al. | 521/170 |
| 4,262,099 | 4/1984 | Heaps et al. | 525/374 |
| 4,476,252 | 10/1984 | Esselborn et al. | 521/172 |
| 4,539,339 | 9/1985 | Cusevrida et al. | 521/137 |
| 4,581,382 | 8/1986 | Liberti et al. | 521/82 |
| 4,670,477 | 6/1987 | Kelly et al. | 521/137 |
| 4,780,482 | 10/1988 | Kreuger | 521/51 |

*Primary Examiner*—John Kight, III
*Assistant Examiner*—D. V. C. Truong
*Attorney, Agent, or Firm*—William G. Conger

[57] ABSTRACT

Polyurethane systems are disclosed utilizing polyvinyl acetate/allyl alcohol random copolymers to produce rigid polyurethane foams and a process for producing the same. The resulting foams exhibit improved K-factors, utilized reduced amounts of fluorocarbons as blowing agents, and maintained insulating properties when formulated with increased amounts of water.

27 Claims, No Drawings

RIGID POLYURETHANE FOAMS PREPARED FROM POLYVINYL ACETATE/ALLYL ALCOHOL POLYOLS, AND PROCESS FOR MAKING SAME

BACKGROUND OF THE INVENTION

1. Field of the Invention

The present invention relates to rigid polyurethane foams, and more particularly, to rigid polyurethane foams prepared from polyvinyl acetate/allyl alcohol polyols and the process for making the same.

2. Description of Related Art

It is well known that a polyurethane foam having insulating utility can be prepared by reacting an organic polyfunctional isocyanate with a suitable hydroxyl component in the presence of a blowing agent such as a fluorinated hydrocarbon. The fluorinated hydrocarbons produce a desirable rise in the foamed product, but also play an important role in producing a foam having a low thermal conductivity or K factor. However, the use of fluorinated hydrocarbons adversely impacts the environment. Regulatory agencies have mandated a reduction in fluorinated hydrocarbon use and have called for the eventual elimination of the use of fluorinated hydrocarbons. Attempts have been made to substitute various blowing agents, such as water, in an effort to find a replacement for fluorinated hydrocarbons. Most of these attempts have produced unsatisfactory results. For instance, while water may be substituted for fluorinated hydrocarbons as a blowing agent, the $CO_2$ produced by the water decreases the insulating properties of rigid foams. Heretofore, it has been known that use of copolymers in urethane systems could produce improved physical and chemical properties such as increased load supporting capacity, increased tensile strength, increased modulus of tensile elasticity, and increased solvent resistance. However, the use of a copolymer, particularly the copolymer used in the instant invention, to improve the resistance to thermal conductivity of the foam has not been recognized.

SUMMARY OF THE INVENTION

Rigid polyurethane foams are prepared from polyvinyl acetate/allyl alcohol polyols. The urethane foam is formulated from a polyol component containing from about 2 to about 100 weight percent of a polyvinyl acetate/allyl alcohol polyol. The polyvinyl acetate/allyl alcohol has at least 2 hydroxyl units.

Objects, features and advantages of this invention are to provide a polyurethane rigid foam suitable for insulating, from a polyurethane system including a polyvinyl acetate/allyl alcohol copolymer, which is characterized by a reduction in the amount of fluorinated hydrocarbons used as a blowing agent, has improved K factors, may be produced by utilizing increased amounts of water as a blowing agent without sacrificing insulation properties, which maintains improved K factors of the foam with aging, produces foams of suitable density, maintains low porosity of foam cells, maintains a suitable gel time and provides an economic copolymer for urethane systems not heretofore known.

These and other objects, features and advantages will be apparent form the detailed description and appended claims which follow.

DETAILED DESCRIPTION OF THE PRESENT INVENTION

The present invention is directed to rigid polyurethane foams prepared from a polyvinyl acetate/allyl alcohol polyol. The urethane foam is formulated from a polyol component containing from about 2 to about 100 weight percent of the polyvinyl acetate/allyl alcohol polyol. The copolymers may be hydroxy, isopropoxy, or isopropyl initiated. However, the copolymers are believed not to be hydroxy or isopropoxy terminated The polyvinyl allyl alcohol has at least 2 hydroxyl groups. The polyvinyl acetate/allyl alcohol polyol may contain from about 2 to about 95 weight percent vinyl acetate and from about 5 to about 98 weight percent allyl alcohol. Preferably, the copolymer includes form about 10 to about to about 25 weight percent allyl alcohol. The molecular weight of the polyvinyl acetate/allyl alcohol polyol may range from about 500 to about 2000.

Preferably, the polyvinyl acetate/allyl alcohol random copolymer is prepared by a free radical process using a continuous process tubular reactor system. U.S. Pat. No. 3,673,168 discloses a tubular reactor and continuous process for producing polymeric materials which are suitable for use in producing the polyvinyl acetate/allyl alcohol random copolymer. U.S. Pat. No. 3,673,168 is hereby incorporated by reference. Ratioed amounts of vinyl acetate monomer and allyl alcohol monomer are continuously fed into a tubular reactor in the presence of a solvent and an initiator. The vinyl acetate monomer is randomly polymerized with the allyl alcohol monomer to yield a polyol in the tubular reactor. The polyol crude product so produced is continuously withdrawn from the tubular reactor reaction mixture.

The polyurethane foam is prepared by reacting an isocyanate with an active hydrogen containing compound, and the polyvinyl acetate/allyl alkyl random copolymer in the presence of blowing agent.

It has been unexpectedly discovered that the use of a polyvinyl acetate/allyl alcohol random copolymer in a urethane foam results in a foam having improved K factors requiring a reduced amount of chlorofluorocarbon as a blowing agent, is tolerable to an increased amount of water as a blowing agent without sacrificing insulation properties and maintains a suitable density and porosity Such advantages can be achieved by utilizing from about 2 percent to about 100 percent, preferably from about 2 percent to about 20 percent, and most preferably from about 5 percent to about 10 percent by weight of the polyvinyl acetate/allyl alcohol random copolymer in the active hydrogen containing component of the urethane system. The amount of polyvinyl acetate/allyl alcohol copolymer utilized in the formulation will vary with the overall polyol system chosen and is an amount effective in producing a foam having lower K-factors than foams produced without the copolymer. In most cases, an amount of the copolymer in the range of about 2 to 20 percent weight of the component will be effective.

Polyurethane foams having the above cited desirable characteristics can be produced utilizing a polyvinyl acetate/allyl alcohol random copolymer with a variety of isocyanates, polyols, and additional ingredients which are more fully described below.

In the more than fifty years since Professor Otto Bayer discovered the addition polymerization reaction leading to polyurethanes (1937), the field of polyurethane polymers has become a well established, mature technology. While the first uses of polyurethanes were in the field of fibers, rigid foams were developed in 1947 and flexible foams in 1952. In the year 1981, world production of polyurethanes exceeded 3 million metric tons.

By the term "polyurethane" is meant a polymer whose structure contains predominately urethane

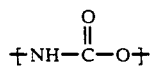

linkages between repeating units. Such linkages are formed by the addition reaction between an organic isocyanate group R-[-NCO]and an organic hydroxyl group [HO-]-R. In order to form a polymer, the organic isocyanate and hydroxyl groupcontaining compounds must be at least difunctional. However, as modernly understood, the term "polyurethane" is not limited to those polymers containing only urethane linkages, but includes polymers containing allophanate, biuret, carbodiimide, oxazolinyl, isocyanurate, uretidinedione, and urea linkages in addition to urethane. The reactions of isocyanates which lead to these types of linkages are summarized in the *Polyurethane Handbook*, Gunter Vertel, Ed., Hanser Publishers, Munich, ©1985, in Chapter 2, pages 7–41; and in *Polyurethanes: Chemistry and Technology*, J.H. Saunders and K.C Frisch, Interscience Publishers, New York, 1963, Chapter III, pages 63–118. In addition to polyols (polyhydroxyl-containing monomers), the most common isocyanate-reactive monomers are amines and alkanolamines In these cases, reaction of the amino group leads to urea linkages interspersed within the polyurethane structure.

The urethane forming reaction is generally catalyzed. Catalysts useful are well known to those skilled in the art, and many examples may be found for example, in the *Polyurethane Handbook*, Chapter 3, §3.4.1 on pages 90–95; and in *Polyurethanes: Chemistry and Technology* in Chapter IV, pages 129–217. Most commonly utilized catalysts are tertiary amines and organotin compounds, particularly dibutyltin diacetate and dibutyltin dilaurate. Combinations of catalysts are often useful also.

In the preparation of polyurethanes, the isocyanate is reacted with the active hydrogen-containing compound(s) in an isocyanate to active hydrogen ratio of from 0.5 to 1 to 10 to 1. The "index" of the composition is defined as the -NCO/active hydrogen ratio multiplied by 100. While the extremely large range described previously may be utilized, most polyurethane processes have indices of from 90 to about 120 or 130, and more preferably from 95 to about 110. In the case of polyurethanes which also contain significant quantities of isocyanurate groups, indices of greater then 200 and preferably greater then 300 may be used in conjunction with a trimerization catalyst in addition to the usual polyurethane catalysts. In calculating the quantity of active hydrogens present, in general all active hydrogen containing compounds other then non-dissolving solids are taken into account. Thus the total is inclusive of polyols, chain extenders, functional plasticizers, etc.

Hydroxyl group-containing compounds (polyols) useful in the preparation of polyurethanes are described in the *Polyurethane Handbook* in chapter 3, §3.1 pages 42–61; and in *Polyurethanes: Chemistry and Technology* in Chapter II, §§III and IV, pages 32–47. Many hydroxyl-group containing compounds may be used, including simple aliphatic glycols, dihydroxy aromatics, bisphenols, and hydroxyl-terminated polyethers, polyesters, and polyacetals, among others. Extensive lists of suitable polyols may be found in the above references and in many patents, for example in columns 2 and 3 of U.S. Pat. Nos. 3,652,639; columns 2–6 of U.S. Pat. No. 4,421,872; and columns 4–6 of U.S. Pat. No. 4,310,632; these three patents being hereby incorporated by reference.

Preferably used, in addition to the polyvinyl acetate-/allyl alcohol polyol, are hydroxyl-terminated polyoxyalkylene and polyester polyols. The former are generally prepared by well known methods, for example by the base catalyzed addition of an alkylene oxide, preferably ethylene oxide (oxirane), propylene oxide (methyloxirane) or butylene oxide (ethyloxirane) to an initiator molecule containing on the average two or more active hydrogens. Examples of preferred initiator molecules are dihydric initiators such as ethylene glycol, propylene glycol, butylene glycol, neopentyl glycol, 1,6-hexanediol, hydroquinone, resorcinol, the bisphenols, aniline and other aromatic monoamines, aliphatic monoamines, and monoesters of glycerine; trihydric initiators such as glycerine, trimethylolpropane, trimethylolethane, N-alkylphenylenediamines, mono-, di-, and trialkanolamines; tetrahydric initiators such as ethylene diamine, propylenediamine, 2,4'-, 2,2'-, and 4,4'-methylenedianiline, toluenediamine, and pentaerythritol; pentahydric initiators such as diethylenetriamine; and hexahydric and octahydric initiators such as sorbitol and sucrose.

Addition of alkylene oxide to the initiator molecules may take place simultaneously or sequentially when more than one alkylene oxide is used, resulting in block, heteric, and block-heteric polyoxyalkylene polyethers. The number of hydroxyl groups will generally equal the number of active hydrogens in the initiator molecule Processes for preparing such polyethers are described both in the *Polyurethane Handbook* and *Polyurethanes: Chemistry and Technology* as well as in many patents, for example U.S. Pat. Nos. 1,922,451; 2,674,619; 1,922,459; 3,190,927; and 3,346,557.

Polyester polyols also represent preferred polyurethane-forming reactants. Such polyesters are well known in the art and are prepared simply by polymerizing polycarboxylic acids or their derivatives, for example their acid chlorides or anhydrides, with a polyol. Numerous polycarboxylic acids are suitable, for example malonic acid, citric acid, succinic acid, glutaric acid, adipic acid, pimelic acid, azelaic acid, sebacic acid, maleic acid, fumaric acid, terephthalic acid, and phthalic acid. Numerous polyols are suitable, for example the various aliphatic glycols, trimethylolpropane and trimethylolethane, α-methylglucoside, and sorbitol. Also suitable are low molecular weight polyoxyalkylene glycols such as polyoxyethylene glycol, polyoxypropylene glycol, and block and heteric polyoxyethylenexypropylene glycols. These listS of dicarboxylic acids and polyols are illustrative only, and not limiting. An excess of polyol should be used to ensure hydroxyl termination, although carboxy groups are also reactive with isocyanates. Methods of preparation of such polyester polyols are given in the *Polyurethane Handbook* and in *Polyurethanes: Chemistry and Technology*.

Also suitable as the polyol are polymer modified polyols, in particular the so-called graft polyols. Graft polyols are well known to the art, and are prepared by the in situ polymerization of one or more vinyl monomers, preferably acrylonitrile and styrene, in the presence of a polyether or polyester polyol, particularly polyols containing a minor amount of natural or induced unsaturation.

Methods of preparing such graft polyols may be found in columns 1-5 and in the Examples of U.S. Pat. No. 3,652,639; in columns 1-6 and the Examples of U.S. Pat. No. 3,823,201; particularly in columns 2-8 and the Examples of U.S. Pat. No. 4,690,956; and in U.S. Pat. No. 4,524,157; all of which patents are herein incorporated by reference.

Non-graft polymer modified polyols are also preferred, for example those prepared by the reaction of a polyisocyanate with an alkanolamine in the presence of a polyol as taught by U.S. Pat. Nos. 4,293,470; 4,296,213; and 4,374,209; dispersions of polyisocyanurates containing pendant urea groups as taught by U.S. Pat. Nos. 4,386,167; and polyisocyanurate dispersions also containing biuret linkages as taught by U.S. Pat. Nos. 4,359,541. Other polymer modified polyols may be prepared by the in situ size reduction of polymers until the particle size is less than 20μm, preferably less than 10μm.

Also useful in preparing polyurethanes are monomers containing other functional groups which are reactive with isocyanates. Examples of these are preferably the amines, for example the substituted and unsubstituted toluenediamines and methylenedianilines; the alkanolamines; the amino-terminated polyoxyalkylene polyethers; and sulfhydryl terminated polymers, to name but a few. The alkanolamines and amines, particularly diamines, are particularly useful, as the amino group reacts faster than the hydroxyl group and thus these molecules can act as isocyanate chain extenders in situ without the need to prepare prepolymers. Examples of hindered, alkyl substituted aromatic diamines which are particularly useful are disclosed in U.S. Pat. No. 4,218,543.

Many isocyanates are useful in the preparation of urethanes. Examples of such isocyanates may be found in columns 8 and 9 of U.S. Pat. No. 4,690,956, herein incorporated by reference. The isocyanates preferred are the commercial isocyanates toluenediisocyanate (TDI) methylenediphenylenediisocyanate (MDI), and crude or polymeric MDI. Other isocyanates which may be useful include isophoronediisocyanate and tetramethylxylylidenediisocyanate. Other isocyanates may be found in the *Polyurethane handbook*, Chapter 3, §3.2 pages 62-73 and *Polyurethanes: Chemistry and Technology* Chapter II, §II, pages 17-31.

Modified isocyanates are also useful. Such isocyanates are generally prepared through the reaction of a commercial isocyanate, for example TDI or MDI, with a low molecular weight diol or amine, or alkanolamine, or by the reaction of the isocyanates with themselves. In the former case, isocyanates containing urethane, biuret, or urea linkages are prepared, while in the latter case isocyanates containing allophanate, carbodiimide, or isocyanurate linkages are formed.

Chain extenders may also be useful in the preparation of polyurethanes. Chain extenders are generally considered to be low molecular weight polyfunctional compounds or oligomers reactive with the isocyanate group. Aliphatic glycol chain extenders commonly used include ethylene glycol, propylene glycol, 1,4-butanediol, and 1,6-hexanediol. Amine chain extenders include aliphatic monoamines but especially diamines such as ethylenediamine and in particular the aromatic diamines such as the toluenediamines and the alkylsubstituted (hindered) toluenediamines.

Other additives and auxiliaries are commonly used in polyurethanes. These additives include plasticizers, flow control agents, fillers, antioxidants, flame retardants, pigments, dyes, mold release agents, and the like. Many such additives and auxiliary materials are discussed in the *Polyurethane Handbook* in Chapter 3, §3.4, pages 90-109; and in *Polyurethanes: Chemistry and Technology*, Part II, Technology.

Polyurethanes may be prepared in the form of films and coatings, fibers, extruded forms, castings and foams. Non-cellular or microcellular polyurethanes are prepared in substantial absence of blowing agents, while polyurethane foams contain an amount of blowing agent which is inversely proportional to the desired foam density. Blowing agents may be physical (inert) or reactive (chemical) blowing agents. Physical blowing agents are well known to those in the art and include a variety of saturated and unsaturated hydrocarbons having relatively low molecular weights and boiling points. Examples are butane, isobutane, pentane, isopentane, hexane, and heptane Generally the boiling point is chosen such that the heat of the polyurethane-forming reaction will promote volatilization.

The most commonly used physical blowing agents, however, are currently the halocarbons, particularly the chlorofluorocarbons. Examples are methyl chloride, methylene chloride, trichlorofluoromethane, dichlorodifluoromethane, chlorotrifluoromethane, chlorodifluoromethane, the chlorinated and fluorinated ethanes, and the like. Brominated hydrocarbons may also be useful. Blowing agents are listed in the *Polyurethane Handbook* on page 101. Current research is directed to lowering or eliminating the use of chlorofluorocarbons in polyurethane foams.

Chemical blowing agents are generally low molecular weight species which react with isocyanates to generate carbon dioxide. Water is the only practical chemical blowing agent, producing carbon dioxide in a one to one mole ratio based on water added to the foam formulation. Unfortunately, completely water-blown foams have not proven successful in many applications, and thus it is common to use water in conjunction with a physical blowing agent.

Blowing agents which are solids or liquids which decompose to produce gaseous byproducts at elevated temperatures can in theory be useful, but have not achieved commercial success. Air, nitrogen, argon, and carbon dioxide under pressure can also be used in theory, but have not proven commercially viable. Research in such areas continues, particularly in view of the trend away from chlorofluorocarbons.

Polyurethane foams generally require a surfactant to promote uniform cell sizes and prevent foam collapse. Such surfactants are well known to those skilled in the art, and are generally polysiloxanes or polyoxyalkylene polysiloxanes. Such surfactants are described, for example, in the *Polyurethane Handbook* on pages 98-101. Commercial surfactants for these purposes are available from a number of sources, for example from Wacker Chemie, the Union Carbide corporation, and the Dow-Corning Corporation.

Processes for the preparation of polyurethane foams and the equipment used therefore are well known to those in the art, and are described, for example, in the *Polyurethane Handbook* in Chapter 4, pages 117-160 and in *Polyurethanes: Chemistry and Technology*, Part II, Technology, in Chapter VII, §§III and IV on pages 7-116 and Chapter VIII, §§III and IV on pages 201-238.

The following Examples illustrate the nature of the invention. All parts are by weight unless otherwise designated. The following abbreviations were employed in the Examples below:

Polyol A is a polyester derived from a phthalic acid and diethylene glycol, having a hydroxyl number of approximately 240, and a functionality of 2.

Polyol B is a polyester derived from phthalic acid and ethylene glycol, having a hydroxyl number of approximately 200, and a functionality of 2.

Polyol C is a polyester derived from diethylene glycol and phthalic acid, having a hydroxyl number of approximately 250, and a functionality of 2.

Polyol D is a polyethylene terephthalate ester derived from PET scrap, having a hydroxyl number of approximately 350, and a functionality of 2.

Polyol E is a mixture of dimethyl and diethylene glycol esters of terephthalic acid, having a hydroxyl number of approximately 310, and a functionality of 2.

PVAc/AA is a random copolymer of polyvinyl acetate and allyl alcohol as prepared by Example 1.

DC 193 is a surfactant available from Dow Corning Midland, Michigan as DC193.

"POLYCAT 8" is N,N-diethylcyclo-hexylamine.

"FREON 11A OR FREON" is a fluorocarbon, preferably trichlorofluoromethane.

Index is the —NCO/active hydrogen ratio multiplied by 100.

"LUPRANATE" M20S is a polymeric methylene diphenyldiisocyanate (MDI), containing about 40 percent 2-ring MDI sold by BASF Corporation.

Mixing time is the period in seconds from the start of mixing of the isocyanate and polyol components until a homogeneous solution is achieved.

Gel time is the period in seconds from the start of mixing of the isocyanate and polyol components until that state is reached whereby the polyaddition product is no longer flowable.

Rise time is the period in seconds from the start of mixing of the isocyanate and polyol components until the foam no longer rises.

Tack free time is the period in seconds from the start of mixing of the isocyanate and polyol components until the surface of the foam is totally tack free.

The physical properties were determined using the following ASTM standards: density - ASTM D1622; compression strength - ASTM D1621; K-factor measured at 75° F. - ASTM C177-85; porosity - ASTM D2856; Friability - ASTM C421-83.

EXAMPLE 1

A polyvinyl acetate/allyl alcohol random copolymer useful in the present invention was prepared by a free radical process utilizing a continuous process tubular reactor system. The following reactants were utilized:

Vinyl acetate, 450 grams
Allyl alcohol, 150 grams
Isopropyl alcohol, 340 grams
50 percent hydrogen peroxide, 70 grams.

The reactants were added in no special order to a 2,000 ml. flask and then transferred to a water-cooled feeder vessel and stirred. Nitrogen was bubbled through the reaction mixture continuously. The mixture was gravity fed into a diaphragm pump and transferred at 450 psi and at a rate of 300 ml per hour into a tubular reactor heated to 155° C. The reaction mixture contact time elapsed from entry to exit in the tubular reactor was approximately 2 hours. A slightly viscous yellow liquid was collected at the end of the tube in a collector vessel. Volatiles were stripped off using a rotary evaporator. The resulting viscous oil was dissolved in ethyl acetate and neutralized to a pH of 8 with aqueous sodium bicarbonate. The organic layer was extracted, then washed with brine. The organic layer was collected and dried over sodium sulfate to give a 4-5percent yield after stripping off ethylene acetate. The resulting polyvinyl acetate/allyl alcohol random copolymer was analyzed with the following results:

Polyvinyl/allyl alcohol copolymer analytical data: GPC WMn =613 g/mole
OH Number =217 mg KOH/g polyol
Percent $H_2O$ =0.19%
Saponification Number =451 mg KOH/g polyol.

The polyvinyl acetate/allyl alcohol copolymer so formed is hereafter referred to as PVAc/AA.

EXAMPLE 2

Rigid polyurethane foams were prepared having the formulations and the physical characteristics indicated below.

TABLE A

| Rigid Foam Formulations | | | | |
|---|---|---|---|---|
| | Example | | | |
| | 1 | 2 | 3 | 4 |
| POLYOL C | 100 | 95 | — | — |
| POLYOL B | — | — | 100 | 95 |
| PVAC/AA | — | 5 | — | 5 |
| DC-193 | 1.5 | 1.5 | 1.5 | 1.5 |
| POLYCAT 8 | 1.1 | 1.1 | 1.1 | 1.1 |
| Water | 2.0 | 2.0 | 2.0 | 2.0 |
| Freon F-11 | 15 | 15 | 15 | 15 |
| Index | 105 | 105 | 105 | 105 |
| LUPRANATE M20S | 93.5 | 92.8 | 81.1 | 80.9 |
| Mix (sec) | 5 | 5 | 5 | 5 |
| Cream (sec) | 18 | 21 | 20 | 21 |
| Gel (sec) | 40 | 42 | 47 | 50 |
| Rise (sec) | 52 | 59 | 63 | 64 |
| Friability | 0 | 0 | 0 | 0 |
| Density (PCF) | 1.98 | 1.82 | 1.96 | 1.93 |
| Porosity (% cc) | 88.4 | 89.2 | 85.0 | 94.6 |
| K-factor (0 days) | .119 | .120 | .122 | .121 |
| K-factor (10 days)* | .133 | .117 | .166 | .134 |

*at 140° F.

This Example shows that when 5 percent by weight of polyvinyl acetate/allyl alcohol random copolymer was added to a polyurethane systems containing Polyol B or Polyol C the resulting foam had a lower K-factor than corresponding polyols containing solely Polyol B or Polyol C respectively. The addition of the polyvinyl acetate/allyl alcohol did not adversely affect the reaction parameters or other physical properties such as density or porosity K-factors were measured at 0 days and at 75° F.

EXAMPLE 3

In this Example, varying weight percents of PVAc/AA were added to a urethane system containing Polyol C. The weight percent of water and Freon were also varied.

TABLE E

| | Foam | | | |
|---|---|---|---|---|
| | 5 | 6 | 7 | 8 |
| Polyol C | 100 | 95 | 90 | 80 |

TABLE E-continued

| | Foam | | | |
|---|---|---|---|---|
| | 5 | 6 | 7 | 8 |
| PVAc/AA | 0 | 5 | 10 | 20 |
| DC-193 | 1.5 | 1.5 | 1.5 | 1.5 |
| POLYCAT 8 | 0.8 | 0.8 | 0.8 | 0.8 |
| Water | 3 | 3 | 3 | 3 |
| FREON F-11A | 10 | 10 | 10 | 10 |
| Total | 115.3 | 115.3 | 115.3 | 115.3 |
| Index | 105 | 105 | 105 | 105 |
| LUPRANATE M20S | 109.1 | 109.00 | 108.83 | 108.66 |
| Mix [sec.] | 7 | 7 | 7 | 7 |
| Gel [sec.] | 49 | 56 | 64 | 69 |
| Rise [sec.] | 68 | 74 | 78 | 88 |
| Tack Free [sec.] | 75 | 71 | 75 | 80 |
| Resin | 149.9 | 149.9 | 149.9 | 149.9 |
| Iso. | 141.8 | 141.7 | 141.6 | 141.3 |
| Density, Core (pcf) | 1.98 | 1.42 | 1.62 | 1.62 |
| Comp Str 10% Par | 50.3 | 25.3 | 25.8 | 26.0 |
| Comp Str 10% Perp | 6.2 | 4.4 | 4.9 | 4.3 |
| K-factor, | | | | |
| Orig | 0.137 | 0.124 | 0.126 | 0.126 |
| 10 days* | 0.138 | 0.125 | 0.126 | 0.125 |
| 30 days* | 0.156 | 0.134 | 0.127 | 0.150 |

*at 140° F.

As can be seen from the above data, a urethane system containing from 5 percent to 20 percent PVAc/AA, 3 percent water and 10 percent Freon consistently produced lower K-factors, at 0 days and after aging for 10 and 30 days at 140° F, in comparison to urethane systems containing solely Polyol C at 140° F.

EXAMPLE 4

In this Example, varying amounts of PVAc/AA were added to a urethane system containing Polyol D.

TABLE C

| | Foam | | | | |
|---|---|---|---|---|---|
| | 9 | 10 | 11 | 12 | 13 |
| Polyol D | 100 | 98 | 95 | 90 | 80 |
| PVAc/AA | 0 | 2 | 5 | 10 | 20 |
| D C 193 | 1.5 | 1.5 | 1.5 | 1.5 | 1.5 |
| POLYCAT 8 | 0.8 | 0.8 | 0.8 | 0.8 | 0.8 |
| Water | 2 | 2 | 2 | 2 | 2 |
| FREON F-11A | 15 | 15 | 15 | 15 | 15 |
| total | 119.0 | 119.3 | 119.3 | 119.3 | 119.3 |
| Index | 105 | 105 | 105 | 105 | 105 |
| LUPRANATE M20S | 118.5 | 117.80 | 116.73 | 114.94 | 111.37 |
| Mix [sec.] | 8 | 8 | 8 | 8 | 8 |
| Gel [sec.] | 48 | 30 | 34 | 34 | 34 |
| Rise [sec.] | 63 | 45 | 51 | 51 | 54 |
| Tack Free [sec.] | 72 | 39 | 42 | 40 | 44 |
| Resin | 154.7 | 155.1 | 155.1 | 155.1 | 155.1 |
| Iso. | 154.05 | 153.1 | 151.7 | 149.4 | 144.8 |
| Density, Core (pcf) | 2.09 | 2.04 | 2.12 | 2.05 | 2.02 |
| Comp Str 10% Par | 56.4 | 47.2 | 55.0 | 51.6 | 50.4 |
| Comp Str 10% Perp | 9.1 | 9.9 | 7.8 | 7.8 | 8.5 |
| K-factor, | | | | | |
| Orig. | 0.139 | 0.126 | 0.125 | 0.131 | 0.129 |
| 10 days* | 0.139 | 0.124 | 0.116 | 0.126 | 0.127 |
| 30 days* | 0.148 | 0.131 | 0.131 | 0.133 | 0.138 |

*at 140° F.

As can be seen from this example, the addition of 2 to 20 percent by weight PVAc/AA to a urethane system containing Polyol D consistently produced lower K-factors at 0 days and after aging at 10 and 30 days compared to urethane systems containing no PVAc/AA.

EXAMPLE 5

In this example, varying amounts of PVAc/AA were added to urethane systems containing Polyol E.

TABLE D

| | Foam | | | | |
|---|---|---|---|---|---|
| | 14 | 15 | 16 | 17 | 18 |
| Polyol E | 100 | 98 | 95 | 90 | 80 |
| PVAc/AA | 0 | 2 | 5 | 10 | 20 |
| D C 193 | 1.5 | 1.5 | 1.5 | 1.5 | 1.5 |
| POLYCAT 8 | 0.92 | 0.8 | 1 | 1 | 1 |
| Water | 2 | 2 | 2 | 2 | 2 |
| FREON F-11A | 15 | 15 | 15 | 15 | 15 |
| total | 120.4 | 119.3 | 119.5 | 119.5 | 119.5 |
| Index | 105 | 105 | 105 | 105 | 105 |
| LUPRANATE M20S | 109.8 | 109.24 | 108.43 | 107.07 | 104.35 |
| Mix [sec.] | 5 | 8 | 8 | 8 | 8 |
| Gel [sec.] | 54 | 73 | 43 | 40 | 41 |
| Rise [sec.] | 70 | 95 | 58 | 58 | 63 |
| Tack Free [sec.] | 77 | 95 | 50 | 50 | 49 |
| Resin | 156.5 | 155.1 | 155.4 | 155.4 | 155.4 |
| Iso. | 142.7 | 142.0 | 141.0 | 139.2 | 135.7 |
| Density | 2.09 | 2.02 | 1.92 | 1.92 | 1.87 |
| Comp Str 10% Par | 52.2 | 42.3 | 48.9 | 41.2 | 42.1 |
| Comp Str 10% Perp | 8.9 | 6.9 | 5.1 | 4.8 | 7.0 |
| K-factor, | | | | | |
| Orig. | 0.129 | 0.130 | 0.128 | 0.131 | 0.127 |
| 10 days* | 0.133 | 0.128 | 0.126 | 0.126 | 0.125 |
| 30 days* | 0.152 | 0.141 | 0.136 | 0.137 | 0.142 |

*at 140° F.

This example shows that the addition of 2, 5, 10, or 20 percent PVAc/AA produces lower K-factors for aged foams at 10 days and 30 days in comparison to urethane systems containing Polyol E and no PVAc/AA. Lower K-factors were observed in systems containing 5 percent or 20 percent PVAc/AA and Polyol E compared to systems containing no PVAc/AA at 0 days. Slightly higher K-factors at 0 days were observed in urethane systems containing 2 percent or 10 percent PVAc/AA and Polyol E in comparison to systems containing no PVAc/AA.

EXAMPLE 6

In this example, varying amounts of PVAc/AA were added to urethane systems containing Polyol A.

TABLE E

| | Foam | | | | |
|---|---|---|---|---|---|
| | 19 | 20 | 21 | 22 | 23 |
| Polyol A | 100 | 98 | 95 | 90 | 80 |
| PVAc/AA | 0 | 2 | 5 | 10 | 20 |
| D C 193 | 1.5 | 1.5 | 1.5 | 1.5 | 1.5 |
| POLYCAT 8 | 0.8 | 0.8 | 0.8 | 0.8 | 0.8 |
| Water | 2 | 2 | 2 | 2 | 2 |
| FREON F-11A | 15 | 15 | 15 | 15 | 15 |
| total | 119.3 | 119.3 | 119.3 | 119.3 | 119.3 |
| Index | 105 | 105 | 105 | 105 | 105 |
| LUPRANATE M20S | 91 | 90.86 | 90.64 | 90.23 | 89.40 |
| Mix [sec.] | 5 | 8 | 8 | 8 | 8 |
| Gel [sec.] | 20 | — | 50 | 50 | 50 |
| Rise [sec.] | 52 | — | 73 | 72 | 74 |
| Tack Free [sec.] | 75 | — | 64 | — | 65 |
| Resin | 155.1 | 155.1 | 155.1 | 155.1 | 155.1 |
| Iso. | 118.3 | 118.1 | 117.8 | 117.3 | 116.2 |
| Density | 2.11 | 2.14 | 2.14 | 2.14 | 2.09 |
| Comp Str 10% Par | 41.0 | 35.4 | 34.6 | 37.7 | 38.9 |
| Comp Str 10% Perp | 3.1 | 6.7 | 7.2 | 6.7 | 8.0 |
| K-factor, | | | | | |
| Orig. | 0.122 | 0.123 | 0.121 | 0.122 | 0.125 |
| 10 days* | 0.137 | 0.145 | 0.123 | 0.125 | 0.136 |
| 30 days* | 0.165 | 0.175 | 0.136 | 0.141 | 0.163 |

*at 140° F.

As can be seen, the addition of 5 to 10 weight percent PVAc/AA to a urethane system containing Polyol A produced lower K-factors and after aging 10 and 30 days as compared to the urethane system containing no PVAc/AA.

EXAMPLE 7

In this example, a urethane foam was made using solely PVAc/AA as the polyol component.

TABLE F

|  | Foam | |
| --- | --- | --- |
|  | 24 | 25 |
| PVAc/AA | 100 | 100 |
| D C 193 | 1.5 | 1.5 |
| POLYCAT 8 | 0.8 | 0.8 |
| Water | 2 | 3 |
| Freon 11 A | 17 | 12 |
| Total | 121.3 | 117.3 |
| Index | 105 | 105 |
| LUPRANATE M20 | 84.31 | 99.87 |
| Mix [sec.] | 12 | 15 |
| Gel [sec.] | 116 | 85 |
| Tack Free [sec.] | 182 | 147 |
| Rise [sec.] | 191 | 155 |
| Density, Core (pcf) | 1.61 | 1.79 |
| Compression Strength | | |
| 10% PAR | 16.2 | 21.1 |
| 10% PERP | 3.1 | 11.3 |
| K-factor, | | |
| original | 0.147 | 0.153 |
| 10 days* | 0.175 | 0.182 |
| 30 days* | 0.190 | 0.203 |

*at 140° F.

As can be seen, a rigid urethane foam can be produced using sole PVAc/AA as the polyol component. Such a foam has useful thermal properties.

The embodiments of the invention in which an exclusive privilege or property is claimed are defined as follows:

1. A process for preparing polyurethane foams comprising reacting:
   an isocyanate, and
   an active hydrogen containing component comprising a polyvinyl acetate/allyl alcohol random copolymer, in the presence of a catalyst and a blowing agent.

2. A process as set forth in claim 1 wherein said copolymer comprises from about 2 to about 100 weight percent of said component.

3. A process as set forth in claim 1 wherein said copolymer comprises from about 2 to about 20 weight percent of said component.

4. A process as set forth in claim 1 wherein said copolymer comprises from about 5 to about 10 weight percent of said component.

5. A process as set forth in claim 1 wherein said active hydrogen containing component further comprises at least one selected from the group consisting of polyether polyol and polyester polyol.

6. A process as set forth in claim 1 wherein said copolymer is present in about 5 weight percent of said component and said component further comprises at least one selected from the group consisting of a polyester derived from a diethylene glycol and phthalic acid, and a polyester derived from ethylene glycol and phthalic acid.

7. A process as set forth in claim 1 wherein said copolymer is present in about 5 to about 20 weight percent of said component and said component further comprises a polyester derived from polypropylene glycol and phthalic acid, and wherein said blowing agent comprises 3 parts water and 10 parts fluorocarbon per 100 parts of said component.

8. A process as set forth in claim 1 wherein said copolymer is present in about 5 to about 20 weight percent of said component and said component further comprises a polyethylene terephthalate ester derived from PET scrap.

9. A process as set forth in claim 1 wherein said copolymer is present in about 5 to about 20 weight percent of said component and said component further comprises a mixture of dimethyl and diethylene glycol esters of terephthalic acid.

10. A process as set forth in claim 1 wherein said copolymer is present in about 5 to about 10 weight percent of said component and said component further comprises a polyester derived from a phthalic acid and diethylene glycol.

11. A process as set forth in claim 1 wherein said copolymer is present in an amount effective in producing a foam having lower K-factors than foams produced by said method without said copolymer present in said component.

12. An urethane foam prepared from the reaction product of
   an isocyanate, and
   an active hydrogen containing component comprising a polyvinyl acetate/allyl alcohol random copolymer, in the presence of a catalyst and a blowing agent.

13. A foam as set forth in claim 12 wherein said copolymer comprises from about 2 to about 100 weight percent of said component.

14. A foam as set forth in claim 12 wherein said copolymer comprises from about 2 to about 20 weight percent of said component.

15. A foam as set forth in claim 12 wherein said copolymer comprises from about 5 to about 10 weight percent of said component.

16. A composition as set forth in claim 12 wherein said active hydrogen containing component further comprises at least one selected from the group consisting of a polyether polyol and a polyester polyol.

17. A foam as set forth in claim 12 wherein said copolymer is present in about 5 weight percent of said component and said component further comprises at least one selected from the group consisting of a polyester derived from a diethylene glycol and phthalic acid, and a polyester derived from ethylene glycol and phthalic acid.

18. A foam as set forth in claim 12 wherein said copolymer is present in about 5 to about 20 weight percent of said component and said component further comprises a polyester derived from diethylene glycol and phthalic acid, and wherein said blowing agent comprises 3 parts water and 10 parts fluorocarbon per 100 parts of said component.

19. A foam as set forth in claim 12 wherein said copolymer is present in about 5 to about 20 weight percent of said component and said component further comprises a polyethylene terephthalate ester derived from PET scrap.

20. A foam as set forth in claim 12 wherein said copolymer is present in about 5 to about 20 weight percent of said component and said component further comprises a mixture of dimethyl and diethylene glycol esters of terephthalic acid.

21. A foam as set forth in claim 12 wherein said copolymer is present in about 5 to about 10 weight percent of said component and said component further comprises a polyester derived from a phthalic acid and diethylene glycol.

22. A foam as set forth in claim 12 wherein said copolymer is present in an amount effective in producing a foam having lower K-factors than foams produced by said method without said copolymer present in said component.

23. A rigid urethane foam produced by reacting
an isocyanate,
an active hydrogen containing component comprising a polyvinyl acetate/allyl alcohol random copolymer, and
a blowing agent comprising water and a fluorocarbon wherein said foam has a lower K-factor than foams produced from formulations having from about 1 to about 50 percent by weight more of said fluorocarbon and no polyvinyl acetate/allyl alcohol random copolymer.

24. A foam as set forth in claim 23 wherein said water comprises from about 2 to about 3 weight percent of said reactants and said fluorocarbon comprises about 10 weight percent of said reactants.

25. A foam as set forth in claim 23 wherein said copolymer comprises from about 2 to about 20 weight percent of said component.

26. A foam as set forth in claim 23 wherein said copolymer comprises from about 5 to about 10 weight percent of said component.

27. A foam as set forth in claim 23 wherein said active hydrogen containing component further comprises at least one selected from the group consisting of a polyether polyol and a polyester polyol.

* * * * *